United States Patent [19]

Markow et al.

[11] 4,428,411
[45] Jan. 31, 1984

[54] RUN-FLAT TIRE AND METHOD OF MAKING SAME

[75] Inventors: Edward G. Markow, Oakdale; M. Alan Kopsco, Wantagh, both of N.Y.

[73] Assignee: Grumman Aerospace Corporation, Bethpage, N.Y.

[21] Appl. No.: 410,583

[22] Filed: Aug. 23, 1982

[51] Int. Cl.$^3$ ............................................. B60C 17/04
[52] U.S. Cl. ............................. 152/330 RF; 152/156; 152/361 R
[58] Field of Search ............... 152/153, 156, 158, 198, 152/197, 199, 196, 200, 204, 205, 330 RF, 361 R, 361 FP, 361 DM, 356 R, 353 R, 261, 262, 284–289, 297–299; 425/28 P

[56] References Cited

U.S. PATENT DOCUMENTS

| 2,945,525 | 7/1960 | Lugli | 152/361 R |
|---|---|---|---|
| 2,963,737 | 12/1960 | Soderquist | 425/28 P |
| 3,214,790 | 11/1965 | Wright et al. | 425/28 P |
| 3,734,157 | 5/1973 | Rogue | 152/354 |
| 3,867,973 | 2/1975 | Cozzolino et al. | 152/153 |
| 3,897,814 | 8/1975 | Grawey | 152/361 R |
| 4,011,899 | 3/1977 | Chamberlin | 152/361 R |
| 4,111,249 | 9/1978 | Markow | 152/330 RF |
| 4,257,836 | 3/1981 | Beneze | 152/361 R |
| 4,293,019 | 10/1981 | Maiocchi | 152/361 R |

FOREIGN PATENT DOCUMENTS 1035341 7/1966 United Kingdom ................ 152/156

OTHER PUBLICATIONS

Blow, C. M., *Rubber Technology & Manufacture*, CRC Press, Ohio (1971) at p. 369.

*Primary Examiner*—Edward C. Kimlin
*Assistant Examiner*—F. K. Wine
*Attorney, Agent, or Firm*—Richard G. Geib

[57] ABSTRACT

A run-flat pneumatic tire having an annular structural compression element in the inside surface of the crown thereof, which compression element is stabilized by a multiplicity of closely spaced spoke-like radial elements in the tire sidewalls such that de-pressurized operation of the tire without damage is possible. The compression element is a helix with closely spaced coils wound from a rod of a cross-sectional shape selected from various solid and tubular configurations. Round, square, and rectangular coil cross-sectional configurations are shown as are interlocking convex/concave, tongue/-groove arrangements. Methods of installing the helical compression element in the tire as by winding up the helix to reduce its diameter such that it can pass through the beads, or by introducing one end of an end coil of the helix over one of the beads into the interior of the tire and providing a relative rotation to feed the helix into the tire are taught. The compression element can be bonded in place and various means for preloading the installed helix are also disclosed.

17 Claims, 10 Drawing Figures

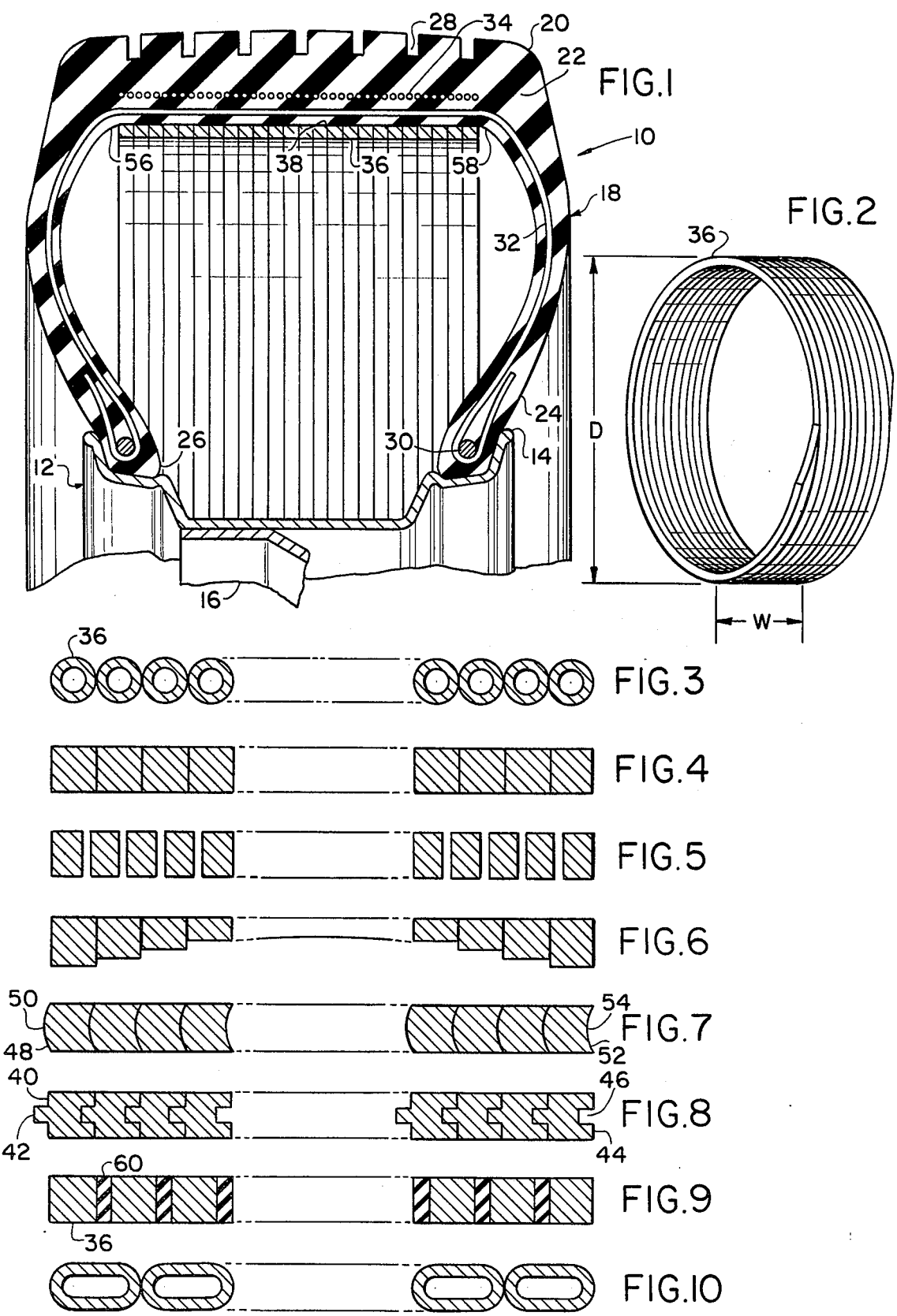

RUN-FLAT TIRE AND METHOD OF MAKING SAME

BACKGROUND OF THE INVENTION

1. Field of the Invention

This invention relates to radial run-flat pneumatic tires and, more particularly, to a run-flat tire having a structural helical coil compression element inserted in the inside of the casing of the tire and to a method of making the same.

An area of tire technology which has engaged investigators over the years is the run-flat pneumatic tire concept. A run-flat pneumatic tire is one designed to support a vehicle for operation even if the tire has partially or totally lost its inflation pressure. The advantages of such a tire in safety, convenience, cost, and weight and space saving are obvious. A recent successful development in the art of run-flat tires is the band-reinforced radial tire invented by one of the inventors in the present application, which banded tire is the subject of U.S. Pat. No. 4,111,249, granted to Edward G. Markow and assigned to the assignee of the present invention. The run-flat tire in that Markow patent, U.S. Pat. No. 4,111,249, is hereby incorporated herein by reference.

A banded run-flat tire is a pneumatic radial tire having a casing with a crown and sidewalls extending from the crown on either side to annular beads which, in a conventional way, are used to mount the tire in a sealed relationship on the rim of a wheel. In the design, the band element, which usually is a thin structural ring of high-strength steel of a fiber/epoxy composite, is incorporated circumferentially into the crown of the tire under the tread thereof. Radial tires, as is well known, have one or more plies containing a multiplicity of closely spaced radial reinforcing cords or wires in the sidwalls of the tire casing. In the tire disclosed in the above referenced patent to Markow, the radial cords or wires function as spoke-like reinforcing elements to stabilize the circumferential band. When the tire is deflated, the radial spoke-like elements and the band stabilized thereby form a load-sustaining structure analogous to an elastic arch. In the design, the band receives vertical, drag, and side loads from the road or ground surface, and carries those loads in compression and bending; the radial spoke-like elements act as tension members to support the axle. A prime function, also, of the closely spaced radial elements is to stabilize the thin band against buckling.

Currently suggested banded tire designs under serious consideration usually call for a band embedded in the crown of the tire underlying the tread. Thus, during the manufacture of the tire, it is required with such designs that the band be integrated into the "green" carcass or casing. During the cure cycle, there has to be an accommodation for transient molding pressures that may degrade the structural integrity of the band. Of course, when the band is embedded in the crown itself of the tire, the retrofitting of existing radial tires with a band to derive the advantages thereof becomes economically infeasible.

2. Description of the Prior Art

There is a showing in the prior art by V. Alfredo Roque (U.S. Pat. No. 3,734,157) of a vehicle tire having annular wire or rod strengthening elements contained in a plurality of separate ridges on the inner surface of the tire casing. Lacking radial spoke-like reinforcing wire or cord elements in the tire sidewalls cooperating with an annular band, V. Alfredo Roque does not disclose a true radial run-flat tire, however, the teaching therein of annular reinforcing elements in the inside surface of the crown of the tire is of interest. Because the annular elements are strengthened by annular rods or wire clusters, they have a fairly high degree of rigidity. Thus, they have to be incorporated into the tire during the construction thereof prior to the forming of the beads. This consideration applies also to the annular bands taught in the banded radial run-flat tire disclosed in the previously referenced U.S. Pat. No. 4,111,249 to Markow.

SUMMARY OF THE INVENTION

This invention is a radial run-flat pneumatic tire having a casing with an annular compression element therein underlying the crown and sidewalls extending therefrom on either side to annular beads. A standard radial tire casing having one or more plies of radial textile cords or metal wires extending from bead to bead can be used for the tire of this invention. In this design, the annular compression element in the crown of the tire is a helix with closely spaced coils, which helix is positioned inside the casing of the tire on the inside surface of the tire crown radially inwardly of the tread portion. In operation, the annular compression element cooperates with the radial elements in the tire sidewalls which act as individual tension spokes to provide load supporting strength such that the compression element is reinforced thereby. For continuous duty, the compression element preferably is bonded in place in the tire. The compression element is a helix made by winding a solid or hollow rod of suitable cross-section on a cylinder. Variations in the lateral flexibility of the element can be attained by varying the size, configuration, or material properties of the axially outer coils with respect to the axially inner coils of the helix. The compression element can be installed in the tire during the tire manufacturing process or it can be installed subsequently to retrofit suitable existing radial tires. Installation of the compression element into the tire can be effected by winding up the helix to reduce its diameter such that it can be installed through the beads into the tire interior. Alternately, the end of an end coil of the helix can be separated from the other coils of the helix and introduced over the bead into the tire casing and the remaining coils can be fed into the casing by a relative rotation between the tire and the helix.

It is thus a principal object of the invention to provide a helical compression element for a radial run-flat pneumatic tire that can be installed in the tire without necessitating any changes in conventional radial tire molding equipment and with only minor changes in plant equipment and manufacturing procedures, and further, to provide a compression element which can be installed readily in conventional radial tires such that any standard radial tire can be retrofitted such that it is puncture resistant and has a run-flat capability.

It is another object of the invention to provide a helix for the compression element for radial run-flat pneumatic tires, the coils of which helix can be wound from rods and tubes of different cross-sectional configurations and mechanical properties such that the performance characteristics of the element can be varied as desired to tailor the behavior of the element to meet various operational requirements.

It is a further object of the invention to provide an annular compression element for radial run-flat pneumatic tires in which it is feasible to replace or to repair the compression element in the event of damage thereto.

Yet another object of the invention is to provide a compression element for radial run-flat tires in which the physical properties can be varied in an axial direction across the element to impart a desired performance response in the tire in operation.

Another object of the invention is to integrate characteristics of the compressive element with the current self sealing coatings conventionally applied to the inner tire crown area.

A still further object of the invention is to provide an improved compression element for run-flat pneumatic tires, which element is of rugged uncomplicated construction, which permits routine retro-fitting of conventional radial tires to give them a run-flat capability, and which is of a requisite strength when stabilized by the radial sidewall elements to permit the tire to be run safely at reasonable speeds for a required distance in an uninflated condition.

Another object is to provide a compressive element, in which during the inastallation process a bonding agent is used and internal pressure is applied to effect prestressing of the carcass sidewall, which prestressing enhances the run flat load carrying ability.

Other objects and advantages will become apparent from a reading of the Specification and a study of the accompanying drawings.

DESCRIPTION OF THE DRAWINGS

For the purpose of illustrating the invention, there is shown in the drawings the form which is presently preferred;however, it should be understood that the invention is not necessarily limited to the precise arrangements and instrumentalities here shown.

FIG. 1 is a sectional view of an embodiment of a tire of the invention which also shows in fragmentary section a wheel with which the tire is adapted to be used;

FIG. 2 is a perspective view of a helical compression element of a tire of the invention; and FIGS. 3 to 10 are sectional views of various embodiments of the helical compression element of a tire of the invention.

DESCRIPTION OF THE PREFERRED EMBODIMENTS

Having now more particular reference to the drawings, FIG. 1 illustrates an embodiment of a tire 10 of the invention mounted on a wheel 12 which may be of a conventional type having a drop center rim 14 welded to a wheel body 16. Tire 10 comprises a carcass or casing 18 having an outer peripheral tread portion 20 in the crown 22 of the casing and sidewalls 24 extending from either side of the crown to beads 26 in the inside peripheral portions of the sidewalls. Grooves 28 in any desired pattern can be incised in tread portion 20 of the casing 18. Beads 26, which can be reinforced with the usual annular cords or wires 30, are adapted to seat in an air-tight relationship in the rim 14 when the tire is mounted on the wheel 12. The sidewalls 24 of the casing are reinforced by the usual known weftless radial plies or elements 32. Further reinforcement of the tire in the crown 22 can be provided by means of the usual annular belt or belts 34. Radial elements 32 and belt 34 can be fabricated out of steel wires or suitable textile fibers as is well known in the art. When mounted on the wheel 12, tire 10 can be inflated through the usual valve (not shown in the FIGS.) in the rim of the wheel.

It will be recognized that the description to this point could apply to the usual radial tire. A run-flat capability is imparted to the radial tire by an annular structural helical coil compression element 36 (FIG. 2) inserted in the tire on the inside surface 38 of the casing 18 radially inwardly of the tread portion 20. Compression element 36 preferably is a multiple-coil helix of a high-strength material such as a suitable metal or reinforced plastic or composite. High strength, in the context of the materials used in the annular compression element, is understood to mean materials having a tensile strength in the range of about 150 ksi and over.

The compression element 36 can be wound from a rod or tube which can have a suitable cross-sectional shape so as to impart a desired physical response to various operating conditions. As shown in FIG. 3, the coils of the helix of the compression element can be circular in cross-section, the term "circular" being understood to include configurations such as round or oval, and the like, having a closed-curved shape as in FIG. 10; or the coils can be square (FIG. 4), or rectangular (FIG. 5) in cross section. As indicated in FIG. 3, if the helix is wound from a tube, the structure will be hollow. If it is desired to vary the response of the compression element to vertical loads applied across the width W of the element (FIG. 2), the physical properties of the material from which the helix is made can be varied across the width by annealing or tempering or otherwise treating specific portions of the helix to obtain the characteristics desired. For example, the coils in the outer ends of the helix can be made stiffer than the coils intermediate the ends. Instead of varying the physical properties across the width, the cross-sectional size or shape can be varied. Thus, as shown in FIG. 6, the coils can be reduced in section from the outer coils transversely inwardly. Of course, should the design requirements so dictate, the transverse properties of the element can be designed such that the intermediate coils are stiffer than the outer coils. Should a greater "crossbeam" shear resistance in the compression element be required, interengaged coils can be provided for the helix.

As shown in FIG. 8, one side 40 of the coils is provided with a tongue 42 and the other side 44 with a groove 46, the tongue and groove extending the length of the helix. When the helix is installed in the tire, the tongue 42 is inserted into the groove 46 to engage the coils of the helix with one another. Should less crossbeam shear resistance be required, a lesser interengagement can be provided. Thus, as shown in FIG. 7, one side 48 of the coils is given a convex 50 shape and the other side 52 a concave 54 shape, the convexity and the concavity extending the length of the helix. As with the tongue and groove arrangement, the convexity is engaged into the concavity when the helix is installed in the tire. In addition to providing greater cross-beam shear resistance, the interengaged coils enhance the puncture resistance in the crown area of the tire. Should it be desired to have a crossbeam shear resistance that varies across the width of the helix, various of the coils thereof will not be provided with interengaging means such that some of the coils of the helix are interengaged and some are not.

In the manufacture of the run-flat tire of the invention, a conventional radial tire casing is used. The compression element can be installed as an added stage in the course of building the tire or the installation can be done as a retrofit operation on an existing radial tire. Preparatory to the installation of the compression element, the inside surface 38 of the tire casing is chemically cleaned using any suitable pre-bonding materials and techniques conventionally employed in the industry. The mating surface of the element is treated with any known primer suitable for the material from which the element is constructed. A flexible epoxy or a suitable rubber bonding compound, preferably of a room-temperature curing type, is applied to the mating surfaces of casing and the element. Following this step, the element is inserted into the tire casing and is pressed radially outward against the inside surface of the casing and the bonding agent joining the element to the casing is allowed to cure for a period of time appropriate for the bonding agent used. A prestress can be applied during the curing cycle by means of an inflatable inner tube installed to apply a radially outward pressure on the inside diameter of the compression element. Preferably the inner tube is pressurized during the curing cycle to a level approximately twice the normal operating pressure of the tire. This pressure is maintained until the bonding agent is cured. As is known, a parting agent such as a PVC film can be used between the inside of the compression element and the outside of the pressurization tube to avoid adhesion between the two. Upon completion of the curing cycle, the pressurization inner tube is removed and the tire is substantially ready for use.

In the design of the compression element helix, its width W should be such that it extends from approximately the shoulder region 56 on one side of the inner surface 38 of the casing to about the shoulder region 58 on the other side. In the helix, with coils having the cross-sectional shapes shown in FIGS. 3 to 6, the spacing between coils can be established as a function of the lateral flexibility desired. Thus, the coils can be in physical contact or a pre-determined space can be left between the coils. A further tailoring of the lateral flexibility is obtainable by spacing the coils of the helix and having a layer or thickness of rubber or suitable elastomeric plastic interposed between the coils (FIG. 9). The free diameter of the helix is made somewhat larger than the inside of the tire such that a radial compressive load is produced between the insert and the tire. This preload tends to straighten the sidewalls of the tire; however, a recognized advantage of this technique of prestressing the helix is that the stresses thereon in the footprint area of the tire during operation are appreciably lowered. Further, in tires provided with annular belting 34, the preload applied by the helix against the crown of the tire places the belting into tension to improve its performance.

The compression element helix has a free diameter D (FIG. 2) greater than the diameter of the casing inside the tire under the crown and diameter D is, of course, significantly larger than the inside diameter of the beads over which the helix has to be passed when it is inserted into the tire. Two methods for overcoming the problem of inserting the helix through the smaller diameter beads are taught in this invention. In the first method, the helix is placed on a suitable cylindrical mandrel or fixture having a diameter smaller than that of the beads and the end of one of the end coils is clamped or otherwise held against the mandrel. The end of the other end coil of the helix is grasped by a suitable tool and a relative rotation between the tool and mandrel is used to wind up the helix in a direction serving to reduce its diameter. When the helix is wound down to a diameter smaller than that of the beads, the mandrel and helix are inserted through the bead on one side into the tire. When properly positioned between the beads, the helix is allowed to unwind to its free diameter and the mandrel and tool are removed. It will be appreciated, of course, if the inside of the tire and the outside of the helix have not been prepared for bonding, such will be done, as described previously, prior to the insertion of the helix into the tire. After the helix has been inserted it is bonded into the tire, also as described previously.

In a second method for inserting the compression element helix, one end of an end coil of the helix is grasped with a suitable tool and the end coil is drawn apart from the other coils. The end of the end coil is introduced over the bead into the casing. A relative rotation between the helix and the tire is provided to feed the coils of the helix into the interior of the tire. In this method, the helix and tire have been prepared for bonding preferably before the helix is fed into the tire. Once the helix is inserted, the subsequent bonding and curing steps are as previously described.

Although it is generally preferred to bond the helix in place in the tire with a bond capable of resisting shear loads created between the inner casing surface and the outside diameter of the helix, for tires used in applications where they undergo low duty cycles it is feasible to use a helix that is not bonded in place. To minimize friction that can occur between the casing and the helix that would cause a heat build up in operation, a film or coating of a low coefficient of friction material can be applied to the inside surface of the casing or on the outer diameter of the helix.

The compression element when installed in a radial tire acts to provide a preload that serves to enhance the load carrying ability of the tire by straightening the tire sidewalls. Its major function, however, is to act in conjunction with the radial sidewall plies to thereby create a structure capable of supporting a full load even when the tire is unpressurized. When the tire is pressurized, the helix acts as a supple tensile member that contributes little or no influence on tire performance. However, when the tire is deflated, the helix is supported and stabilized by the radial sidewall elements such that the helix acts as a structural flexible-arch compression member which can support the unpressurized tire for operation under load.

Although shown and described in what are believed to be the most practical and peferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall within the scope of the appended claims.

What is claimed is:

1. A run-flat pneumatic radial tire having a casing with a tread portion in the crown thereof, sidwalls extending from said crown on either side to annular bead portions on the inner periphery on each side of said tire, said beads being adapted to mount said tire on the rim of a wheel, tensioned annular belt means in said tire crown radially inwardly of said tread portion, a resilient annular compression element of high strength material comprising a helical coil, the coils of which are adjacent one another in a stressed condition, bonded, as an added stage in the course of building the tire or as a retrofit operation on an existing radial tire, inside said casing on the inside surface of the crown thereof radially inwardly of said tread portion, said sidewalls having therein a multiplicity of closely spaced substantially radial spoke-like reinforcing elements cooperating with said compression element, said radial elements having freedom of shear with respect to one another and being connected to said beads and extending therefrom to at least the crown region of said tire, and wherein inflation means inflated inside said helical compression element prior to the bonding thereof to a pressure approximately twice the normal operating pressure of said tire has been used to prestress said helical compression element to cause the coils thereof to have relative movement with respect to one another whereby the circumferences of said compression element and said inside surface of said tire crown are expanded to greater than their normal diameter at normal operating pressure so that a prestress is transmitted to said belt means, said prestress being locked in when said compression element is bonded, wherein said tensioned annular belt means act as a supplemental structure with said stressed compression element to increase the load-capability thereof in the run-flat condition of said tire.

2. The tire as defined by claim 1 wherein the coils of the helix comprising the compression element are in contact with one another.

3. The tire as defined by claim 1 wherein said compression element has a width substantially spanning the inside surface of the crown of said tire.

4. The tire as defined by claim 1 wherein each of the coils of the compression element helix in cross-section has a circular configuration.

5. The tire as defined by claim 1 wherein each of the coils of the compression element helix in cross-section has a square configuration.

6. The tire as defined by claim 1 wherein each of the coils of the compression element helix in cross-section has a rectangular configuration.

7. The tire as defined by claim 1 wherein one side of some of the coils of the compression element helix has a convex configuration and the other side has a concave configuration, said convexity and said concavity engaging one another when said compression element is installed for operation in said tire.

8. The tire as defined by claim 1 wherein one side of some of the coils of the compression element helix is provided with a tongue and the other side with a groove, said tongue and said groove engaging one another when said compression element is installed for operation in said tire.

9. The tire as defined in claim 1 wherein the helix of the compression element is wound from a solid rod.

10. The tire as defined in claim 1 wherein the helix of the compression element is wound from a tubular rod.

11. The tire as defined by claim 1 wherein a elastomeric material is interposed between the coils of the compression element helix.

12. The tire as defined by claim 1 wherein the resilience of coils of the compression element helix is varied such that the flexibility of coils in one axial portion of the helix differs with respect to other axial portions thereof whereby the lateral flexibility of the helix is varied.

13. The tire as defined by claim 7 wherein the convexity and the concavity extend the length of the helix such that all of the coils thereof are interengaged thereby.

14. The tire as defined by claim 8 wherein the tongue and the groove extend the length of the helix such that all of the coils thereof are interengaged thereby.

15. The tire as defined by claim 12 wherein the resilience of coils of the compression element helix is controlled by varying the physical properties of selected portions along the length of the material from which the helix is made such that the coils wound from said selected portions will have the desred resilience.

16. The tire as defined by claim 12 wherein the resilience of coils of the compression element helix is controlled by varying the cross-sectional size of those coils.

17. The tire as defined by claim 12 wherein the resilience of coils of the compression element helix is controlled by varying the cross-sectional shape of those coils.

* * * * *